Patented Jan. 8, 1935

1,987,485

UNITED STATES PATENT OFFICE 1,987,485

PROCESS FOR THE MANUFACTURE OF WHITE PORTLAND CEMENT IN A ROTARY KILN

Jean Mercelis, Antwerp, Belgium

No Drawing. Application April 9, 1934, Serial No. 719,751. In Germany April 25, 1933

6 Claims. (Cl. 106—25)

This invention relates to the manufacture of white Portland cement in a rotary kiln, employing raw materials poor in Fe oxide. In general a green clinker is obtained when employing such raw materials, the green coloration having been hitherto attributed to the presence of the metallic oxides of Fe and Mn. It has already been proposed to reduce the aforesaid clinker in order to decolorize the same, treating this hot clinker with reducing substances such as coal, oils, paraffins, CO, etc. This invention is based on the ascertaining that the green coloration of the clinker is due mainly to Na—sulphide-compounds: ultramarines, the presence of which in the clinker was not previously suspected. Starting from this ascertaining, my invention consists substantially in treating the hot clinker with acids or substances liberating acids, in order completely to destroy the aforesaid sulphides, formed during the roasting process in the clinker, and consequently completely to destroy the green ultramarine—coloration, obtaining so a white Portland cement. The clinker in this way re-acquires a white colour, which is purer than that obtained by the hitherto known processes. According to one embodiment of the invention, the clinker is treated with complete carbonic acid ($CO_2+H_2O$). It has, indeed long been known that dry carbonic anhydride is incapable of acting destructively on ultramarine and that water alone only incompletely destroys the ultramarines. A suitable source of the complete carbonic acid is the hot combustions—gases, rich in $CO_2$, when they are brought, in presence of water, into contact with the hot clinker which has passed beyond the combustion zone, by means of nozzles, f. i.

In the preferred mode of carrying out, the invention, the carbonic acid, necessary for destroying the ultramarine is produced by bringing into contact with the clinker, whilst still hot in the kiln, substances, capable of yielding, alone by decomposition or with the aid of added oxygen (for instance simultaneously introduced through the medium of oxidizing agents) complete carbonic acid, i. e. $CO_2$ together with its water of constitution.

Particularly suitable sources of complete carbonic acid are the more highly oxygenated organic compounds: for example carbohydrates such as cellulose, saccharose and the starches and their derivatives, the organic acids and their salts. In all cases the presence of sufficient oxygen to form carbonic acid is necessary and also water, or hydrogen, which, in the presence of oxygen furnishes the water necessary for the constitution of the carbonic acid.

According to one embodiment of this invention, there may be employed inter alia: as source of cellulose, all substances very rich in cellulose, yielding on distillation by heating principally complete carbonic acid. As source of saccharose or starch: industrial waste (such as sugar—molasses, pulp) or amylaceous vegetable products, which principally comprise those carbohydrates (such as potatoes, acorns, grain, broom and other herbs rich in starch).

Non-oxygenated, or only slightly oxygenated substances, generally employed as reducing agents, such as coal, lignite, oils, paraffine, and other hydrocarbons are obviously not suitable for the process according to the present invention, for there is no presence of sufficient oxygen to form complete carbonic acid.

The quantity of the carbonic-acid generating substances employed, amounts to about 4 to 6% of the weight of the clinker. The said substances are introduced between the zone of roasting and the outlet of the kiln, for example continuously with the aid of a pipe passing through the top of the kiln. According to another embodiment of the process, the ultramarine, and consequently the green coloration, may be destroyed by spraying the hot clinker still in the kiln, with an atomized jet of an acid, or a salt, yielding an acid on decomposition at high temperature.

In combination with one of the aforementioned means, a chloride or fluoride (or mineral product having a chloride or fluoride as basis) may be added to the paste, in a manner known per se. In this way the decolorizing action of the carbonic acid is facilitated, and the degree of temperature of roasting is favourably lowered owing to their having property of a flux.

Having now particularly described and ascertained the nature of my said invention and in what manner the same is to be performed, I declare that what I claim is:

1. A process for the manufacture of white Portland cement in a rotary kiln, employing raw materials poor in Fe oxide, which consists in treating the clinker, whilst still hot after roasting with acids or substances yielding acids at high temperature.

2. A process as claimed in claim 1, which consists in treating the hot clinker with complete carbonic acid ($CO_2+H_2O$).

3. A process as claimed in claim 1 which consists in treating the hot clinker with complete carbonic acid ($CO_2+H_2O$) which has been produced within the mass of clinker, whilst still hot, by using substances which in contact with the hot clinker evolve complete carbonic acid by decomposition.

4. A process as claimed in claim 1 which consists in treating the hot clinker with complete carbonic acid ($CO_2+H_2O$) which has been produced within the mass of clinker, whilst still hot, by using substances which in contact with the hot clinker evolve complete carbonic acid by decomposition, said substances consisting of carbohydrates or being rich in these compounds, in the form of industrial or vegetable products rich in starch.

5. A process as claimed in claim 1, which consists in projecting onto the hot clinker an atomized jet of an acid or a salt yielding an acid on decomposition at high temperature.

6. A process as claimed in claim 1, which consists in also adding a chloride of fluoride, or products having these substances on basis, to the raw materials, in a well known way.

JEAN MERCELIS.